United States Patent
Malavasi

[15] 3,639,824
[45] Feb. 1, 1972

[54] POWER FEED REGULATOR SYSTEM FOR TEMPERATURE REGULATION AND THE LIKE

[72] Inventor: Claude Malavasi, 12, Avenue d'Alsace-Lorraine 74, Annemasse, France

[22] Filed: Aug. 3, 1970

[21] Appl. No.: 60,569

[30] Foreign Application Priority Data

Aug. 11, 1969 France ..................6927489

[52] U.S. Cl. ..........................318/599, 165/26, 318/609, 318/678, 318/681, 323/19, 323/40, 328/151, 330/110
[51] Int. Cl. .........................................G05d 23/24
[58] Field of Search ..................165/26; 236/1 C, 78 R; 307/230, 235; 318/599, 609, 610, 625, 681, 678; 323/17, 22 SC, 24, 40, 75 N; 328/150, 151; 330/69, 30 D, 110

[56] References Cited

UNITED STATES PATENTS

| | | | |
|---|---|---|---|
| 3,049,672 | 8/1962 | Zinke | 328/150 X |
| 3,320,533 | 5/1967 | Watters | 307/230 X |
| 3,538,445 | 11/1970 | Brennen | 330/69 X |
| 3,500,898 | 3/1970 | Gerhart, Jr. et al | 165/26 |
| 3,541,457 | 11/1970 | Leighty et al | 328/150 |
| 3,482,116 | 12/1969 | James | 328/151 X |
| 3,371,708 | 3/1968 | Chaparro | 165/26 |
| 3,486,499 | 12/1969 | Yen | 330/69 X |
| 3,512,579 | 5/1970 | Muskovac | 165/26 |
| 3,497,778 | 2/1970 | Gerber | 318/625 X |

Primary Examiner—A. D. Pellinen
Attorney—Henry W. Archer

[57] ABSTRACT

A power feed regulator system for temperature regulation and the like includes an input analog circuit which provides a control signal related both to ambient temperature and to a preset control point. The control signal is amplified and applied to the inverting input of a first power feed regulator and to the noninverting input of a second power feed regulator. Depending on whether the signal is positive or negative, only one or the other power feed regulator is operated and actuates a triggering circuit which starts up a servo motor provided for turning on or off an appliance such as a hot water supply valve. Each power feed regulator has a hysteresis comparator comprising an operational amplifier, a resistor and a capacitor in series between the output of the amplifier and the ground with a feedback loop applying to the inverting input of the power feed regulator a part of the voltage between the terminals of the capacitor. The power feed regulator delivers an output periodic square-wave voltage having lower and higher values independent of its input voltage and an average power substantially proportional to the input voltage.

8 Claims, 7 Drawing Figures

POWER FEED REGULATOR SYSTEM FOR TEMPERATURE REGULATION AND THE LIKE

The purpose of the invention is to obtain, with a voltage capable of taking on alternately only two determined values, one operating value and one rest value, an output power substantially proportional to an input voltage whose value lies between two limits, and permit the feeding of this output power by modifying the said input voltage.

The invention relates to an electric power feed regulator making it possible to achieve the stated purpose and being able to secure the "on-off" control of a differential regulation circuit provided with such a power feed regulator.

This electric power feed regulator is particularly well suited to the control of the differential regulation of temperature in central heating installations.

Many power feed regulators, of the voltage amplifier type, have been proposed. Among these, we may mention certain cyclic feed regulators delivering a periodic output signal the operation/rest ratio of which must be adjusted manually. This signal actuates a relay one contact of which permits the heating of a resistor coupled to a thermistor forming part of the amplifier, which decreases the gain of the latter and cuts out the relay. The time constant of such a device is determined by the thermal inertia of the resistor-thermistor assembly. It is thus not adjustable. Moreover, as the resistor forms part of a simple amplifier, it is not possible to obtain an "on-off" (square-wave) output signal, which in particular prevents the direct operation of thyristors mounted on the control circuits of the regulation servomotors.

The power feed regulator according to the invention eliminates these disadvantages and in particular allows the "on-off" operation of such thyristors.

It comprises:

a hysteresis comparator circuit, composed of an operational amplifier with two inputs—one inverting input and one noninverting input—the output voltage of which is limited by a diode and is at least partially applied, by feedback, to the noninverting input, an impedance comprising a capacitor and a resistor connected in series at the output of this hysteresis comparator, a feedback loop applying to the inverting input of the hysteresis comparator at least a part of the voltage existing at the terminals of the capacitor; the whole being arranged so that the application of an input voltage to the input of the power feed regulator produces, when this voltage is between the two limit values, the appearance of a condition of relaxation oscillations, due to the successive charging and discharging of the capacitor, this oscillatory condition permitting the power feed regulator to deliver at its output a periodic square wave voltage signal whose magnitudes—lower or rest, and higher or operation—are independent of the input voltage; the frequency of this output voltage and, for each period, the ratio of operating time to period varying as a function of the input voltage such that the average power available at the output of the power feed regulator is substantially proportional to this input voltage.

Another object of the invention is a differential regulation circuit comprising this electric power feed regulator, and further comprising:

an analogue circuit delivering a fixed reference voltage and a variable measurement voltage, the difference between which, or error voltage, is proportional at each instant to the difference between the value at this instant of the quantity to be regulated and its set value, a differential amplifier to which are applied the reference and measurement voltages, and whose output is provided with an excursion limiter, at least one regulating servomotor and its triggering circuit; wherein said power feed regulator is placed between the output of the differential amplifier and the input of the triggering circuit of the servomotor, the whole being arranged such that, with the output voltage of the differential amplifier applied to the input of the electric power feed regulator, the latter drives on an "on-off" basis the servomotor triggering circuit with a power substantially proportional to this output voltage and causes the operation of the servomotor which brings the quantity to be regulated to its set value.

The invention will be better understood from the following description of a particular embodiment of the electric power feed regulator and of a particular application of this feed regulator, given by way of example, with reference to the following drawings, in which.

Figure 4:
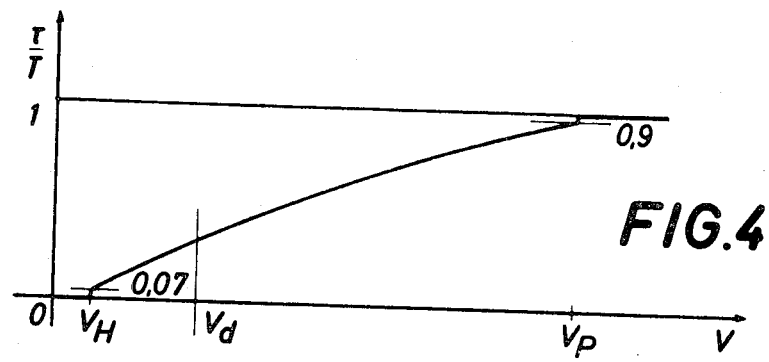
Figure 5:
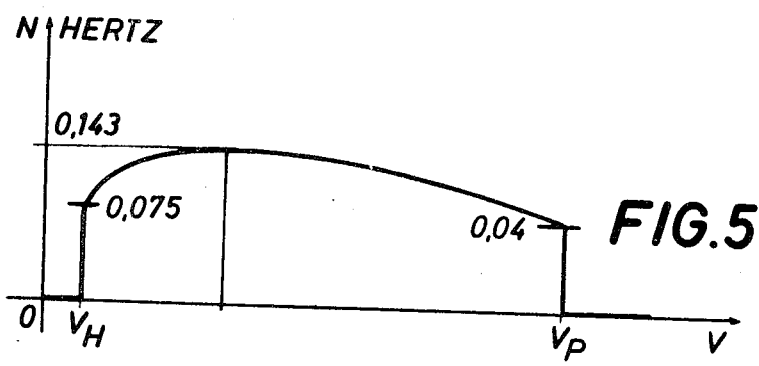
Figure 6:
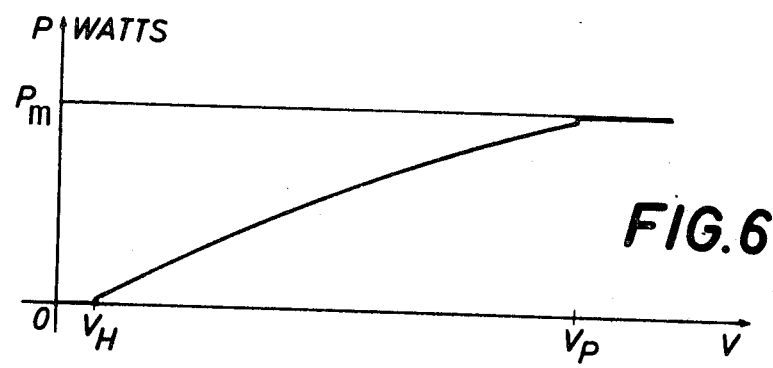
Figure 7:
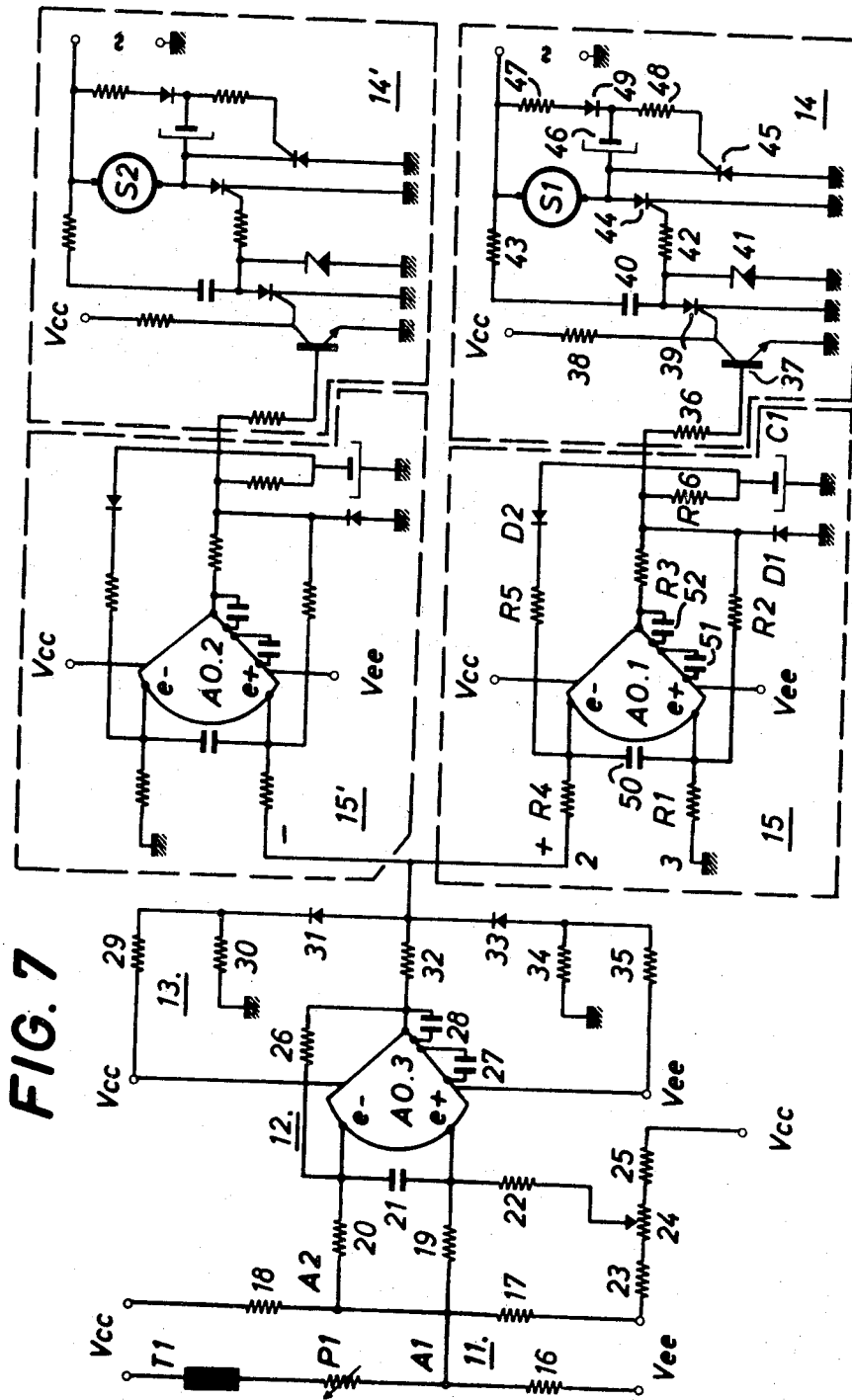

FIG. 4 gives, for the positive values of the voltage V applied to the input of the power feed regulator, the value of the ratio $\tau/T$ of the operating time, during which the voltage U conserves, for each period T, its maximum value, to this period T of the periodic voltage U;

FIG. 5 is the frequency variation of the voltage U for positive V;

FIG. 6 is the output power variation curve of the power feed regulator according to the invention, for positive V;

FIG. 7 is the diagram of a device providing the differential regulation of temperature in a central heating installation, which circuit is provided with two electric power feed regulators according to the invention.

Figure 1:
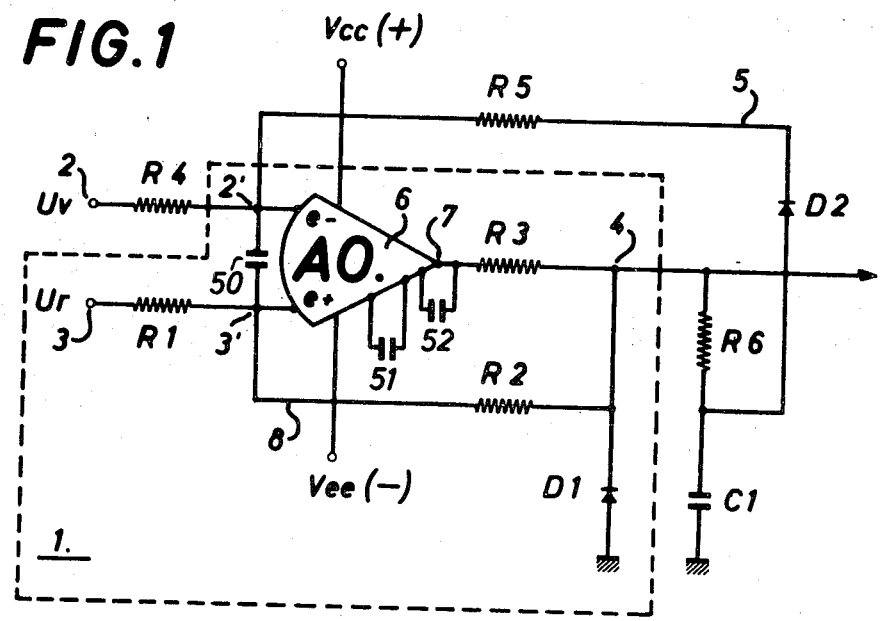
FIG. 1 is the diagram of an electric power feed regulator according to the invention, that of the hysteresis comparator which is one of its elements being shown in a broken line.

Referring now to FIG. 1, the electric power feed regulator comprises a hysteresis comparator 1 with two inputs 2' and 3, the output 4 of which is charged by an impedance (R6, C1) consisting of a resistance R6 mounted in series with a polarized capacitor C1. The voltage at the terminals of the capacitor C1 is partially applied to the input 2' of the comparator 1 by a feedback loop 5 including, in series, a diode D2 the role of which will be seen later, and a resistor R5. A resistor R4 is inserted between the input 2' of the comparator 1 and the input 2 of the electric power feed regulator.

The hysteresis comparator 1 includes an amplifier 6 of the type known as an operational amplifier (AO) theoretically having an infinite input impedance and gain and a zero output impedance.

This operational amplifier 6, supplied with two DC voltages Vcc>0 and Vee<0, has a noninverting input e+ and an inverting input e+ connected respectively at 3', a point separated from the input 3 of the comparator by a resistance R1, and to the input 2' of this comparator.

At the output 7 of the operational amplifier 6 is placed a load limiting resistor R3 leading to the output 4 of the comparator 1. A diode D1 is placed between the ground and the output 4. Its role is to limit the excursion of the output voltage U of the comparator to lower limit value equal, in the considered case, together $R_3$ and D1 form a lower voltage limiting means, here equal feedback loop 8, leading at 3', to the noninverting input e+. This loop 8 includes a resistor R2 designed to partially apply the voltage U to this noninverting input e+. Two capacitors 51 and 52 are coupled on the operational amplifier 6 for frequency compensation while a capacitor 50, connected between the inputs e− and e+, makes it possible to short circuit any interference.

The assembly R4, R5, R6 constitutes a voltage divider between the output voltage U of the comparator 1, i.e., also that of the power feed regulator, and the voltage Uv applied to the input 2 of the power feed regulator. The assembly R1, R2, constitutes a voltage divider between the voltage U and the voltage Ur applied to the input 3 of the power feed regulator.

Figure 2:
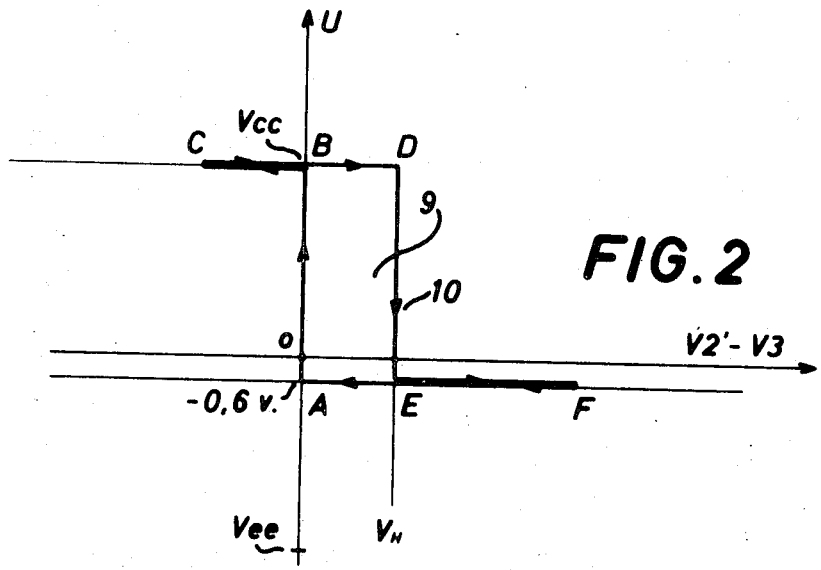
FIG. 2 is the graph of the transfer function of this hysteresis comparator.

The transfer function, shown in FIG. 2, shows the variations of the voltage U as a function of those of V2'–V3', these two voltages being those existing at the points 2' and 3 respectively. It has the form of a rectangular hysteresis cycle 9 the edges of which are parallel two by two to the reference axes. The upper edge BD is extended, for a negative value of V2'–V3, by a plateau BC and the lower edge AE is extended, for V2'–V3 greater than Vh by a plateau EF. The upper part CBD of the cycle 9 is at the voltage Vcc while the lower part AEF of this same cycle is at the voltage −0.6 volt (voltage imposed by diode D1).

Vh is the threshold value which must be crossed, in increasing values, by V2'–V3 in order to trigger the comparator 1 and make the voltage U go from Vcc to −0.6 volt. This threshold is proportional to the ratio R1/(R1+R2). It is thus possible to modify the width of the hysteresis cycle 9 by placing on R1 and/or R2. The purpose of the diode D2 is to prevent free oscillations which might appear if the hysteresis threshold becomes lower than the conduction threshold of diode D1.

The hysteresis cycle 9 runs in the direction indicated by the arrows 10.

The operation of the power feed regulator according to the invention is as follows:

Ur is a fixed reference voltage (0 volt for example) and Uv a variable voltage. The quantity V=Uv−Ur is defined as the input voltage of the power feed regulator. It will in fact be noted that only this difference is considered here and that the operation of the power feed regulator may be described in the same manner if the voltages Uv and Ur are reversed with regard to the inputs 2 and 3 of the said power feed regulator.

Let us suppose that Uv is initially equal to Ur. No power will appear at the output of the power feed regulator. A decrease in Uv produces a decrease in V2' and brings the quantity V2'–V3 to a negative value which produces the triggering of the hysteresis comparator 1 and the passage of U from −0.6 volt (point A of the cycle 9) abruptly to Vcc (point B of cycle 9). The voltage U is in fact applied by feedback, via R2, to the noninverting input e+ of the comparator 1. This sudden increase in U produces the progressive charging of the capacitor C1 via the resistor R6 and the increase in the voltage Uc at the terminals of this capacitor. The smaller the time constant of R6–C1, the shorter the transient state of the charge of capacitor C1. With the voltage Uc partially applied, via the feedback loop 5, to the inverting input e− of the comparator 1, the voltage V2' increases until V2'–V3 which has become positive, reaches the values $V_H$ (point G of cycle 9), thereby producing the triggering of the comparator 1 and the drop in the voltage U to the value −0.6 volt (point E of cycle 9), while the voltage U7 goes from Vcc to Vee. The capacitor C1 is then discharged through the resistor R6. After reaching its maximum value (point F of cycle 9), the voltage V2' decreases so that V2'–V3 again becomes negative (point A of cycle 9) and initiates another cycle identical to the preceding one. The same reasoning could be repeated for the case in which Uv would become higher than Ur at the start.

Figure 3:
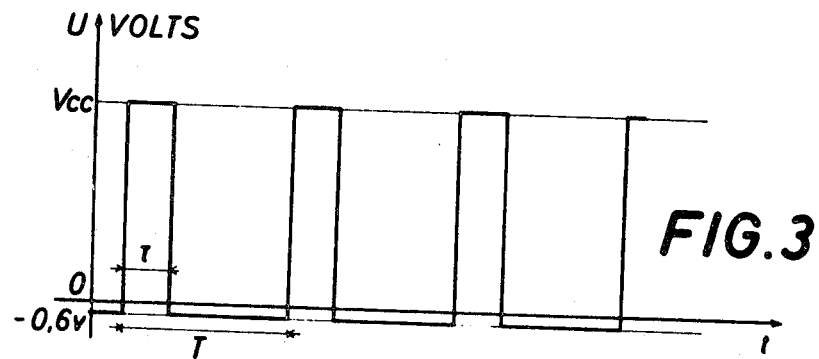
FIG. 3 represents the periodic variations of the voltage U delivered at the output of this power feed regulator for a given value $V_d$ of the voltage applied to its input.

Thus, the application of a voltage V to the input of the power feed regulator produces at its output a voltage U which undergoes a steady state of maintained relaxation oscillations making the voltage pass alternately from a minimum value of −0.6 volt to a maximum value of Vcc (square-wave signals). This periodic state is represented in FIG. 3. Its period T is equal to the time required to go through a complete hysteresis cycle 9 (ABCDEFA).

For each period, the voltage U conserves its maximum value (Vcc) for a time $\tau$ (operating time) corresponding to the path BCDE of the cycle 9. It retains its minimum value (−0.6 volt) for a time $\tau$ (operating time) corresponding to the path BCDE of the cycle 9. It retains its minimum value (−0.6 volt) for a time T−$\tau$ (rest time) corresponding to the path EFAB.

FIG. 4 shows the variation in the ratio $\tau$/T for positive V. This ratio remains zero as long as U has not reached $V_H$ (path CD of cycle 9), which value triggers the oscillation cycle. It reaches the value 1 (U=Vcc permanently), when V becomes higher than a certain value $V_P$ which depends on the values given to R4, R5 and R6 and which is such that the voltage V2', which causes triggering of comparator 1, can never be reached.

FIG. 5 shows the variation in the frequency N of the voltage U for positive V. From V=$V_H$ to V=$V_P$, this frequency first increases then decreases. In the same interval, $\tau$/T (FIG. 4) increases in a manner substantially proportional to V. The average power available at the output of the power feed regulator varies in the same manner, thus allowing this power to be regulated in manner substantially proportional to the input voltage V (FIG. 6).

By modifying the value of the capacitor C1 or that of the resistors R5 or R6, in particular, it is obviously possible to modify the variation rate of the ratio $\tau$/T as a function of V, and thus the curve shown in FIG. 4 of which the point $V_d$ corresponds to the periodic state of U shown in FIG. 3.

With everything else equal, an increase in the value of C1 produces an increase in the ratio $\tau$/T, whereas a decrease in the values given to R5 and to R6 produces a decrease in the ratio $\tau$/T.

In the embodiment of the electric power feed regulator shown in FIG. 1, it is possible to obtain a ratio of maximum power, reached just before voltage U becomes stable, to minimum power, reached just after this voltage becomes periodic, which exceeds 100 (FIG. 6) for the following values:

| | |
|---|---|
| Vcc=+4.5 volts | R5=100 KΩ |
| Vee=−4.5 volts | R3=1 KΩ |
| C1=1,000 µf. | R2=1 MΩ |
| R1=R4=$R_6$=10 KΩ | D1 and D2=diodes OA 91 |

Measurements carried out just after the start of the periodic state of U and just before its steady state holding at the maximum value Vcc, have given respectively:

| | |
|---|---|
| $N_1$=0.075 Hertz | $\tau/T_1$=0.07 |
| $N_2$=0.04 Hertz | $\tau/T_2$=0.9 |

The power feed regulator according to the present invention thus behaves like a voltage-frequency converter to which would be associated a hysteresis comparator or a shaping amplifier, followed by a monostable multivibrator, allowing square wave signals to be obtained.

However, it has the advantage over such assemblies of being of much simpler design and, consequently, much more economical.

For V>$V_P$, this feed regulator can operate in DC power (blocking of comparator 1 in active position). The value $V_P$ may, for this purpose, be adjusted by choosing appropriate values for the resistors R4, R5 and R6.

It will be noted, more particularly, that the present power feed regulator is in a preferential position when 0<V<$V_H$. Within this range, any reversal in the direction of variation of V immediately causes the triggering of the comparator 1 and the passage of the voltage U from the value −0.6 volt to Vcc, or vice versa.

Owing to its ability to offer, for an adjustable input range ($V_H$−$V_P$), a periodic output voltage in square-wave signals, capable of taking on only two determined values (on-off), the power feed regulator according to the invention may be used for the proportional control of thyristors, which are switched at zero voltage; for that of electric motors having imposed supply voltages and for the elimination of hunting in any regulation system by maintaining a very high gain and introducing a time constant which increases when one approaches the steady state for which V>$V_P$.

The regulation circuit provided with the electric power feed regulator according to the present invention is a differential circuit of the type which will now be described and which is intended for the differential regulation of temperature in a central heating installation (FIG. 7).

This circuit comprises a Wheatstone bridge 11 one arm of which is provided with a thermistor T1 connected in series with a control potentiometer P1 having in three of its branches resistances 16, 17 and 18. A differential amplifier 12 whose output is provided with an excursion limiter 13, as well as two servomotors S1 and S2 and their triggering circuits 14 and 14'. Each of these triggering circuits is driven, on an "on-off" basis, by an electric power feed regulator according to the invention (respectively 15 and 15'). The input 3 (FIG. 1) of the feed regulator 15' and the input 2 of the feed regulator 15 are connected together to the output of the differential amplifier 12 while the input 2 (FIG. 1) of the feed regulator 15' and the input 3 of the feed regulator 15 are connected to the ground.

The values of the elements used in the differential regulation circuit are

| Component | Resistance in ohms |
|---|---|
| 16-20, 23, 25 | 10K |
| 22, 26 | 1M |
| 24 potentiometer | 2K |
| 29, 35 | 1200 |
| 30, 34 | 270 |
| 32, 38 | 1K |
| 36 | 20K |
| 42 | 220 |
| 43 | 150 |
| 47 | 3.3K |
| 48 | 100 |
| 11 thermistor | 7500 |
| P1 potentiometer | 5K |
| | Identification or value: |
| 21, 50 | 47 nanofarads |
| 27, 51 | 10 nonofarads 52 |
| 28, 52 | 3 nanofarads |
| 31, 33 | diode OA 91 |
| 37 | NPN-transistor 2N1711 |
| 39, 44, 45 | thyristor TD4001 |
| 40 | 1 microfarad |
| 41 | Zener diode MZ6 A |
| 46 | 25 microfarad DC |
| 49 | diode 1N649 |

The two inputs A1 and A2 of the differential amplifier 12 are each connected to one end of the balance diagonal of the Wheatstone bridge 11 through resistances 19 and 20. The end of the other diagonal of the bridge to which leads the thermistor T1 is at the potential Vcc, positive, while the other end of this diagonal is at the potential Vee, negative.

A potentiometer 24 to which leads the resistor 22 of the differential amplifier is used for 0 offset and is mounted in series between resistance 23, connected to resistance 17 of Wheatstone Bridge 11, and a resistance 25 which is at potential Vcc. The excursion limiter 13 is composed of two voltage dividers including resistors 29, 30 and 34, 35 and connected to the output of the differential amplifier by diodes 31, 33 through a resister 32. The purpose of this excursion limiter is to limit, in the present case, to ±5 volts the driving voltage of the operational amplifiers A0.2 and A0.1 of the power feed regulators 15' and 15 respectively. This limitation is imposed by the manufacturer on these operational amplifiers.

The differential amplifier 12 is itself equipped with an operational amplifier A0.3 between whose inputs (e− and e+) is connected a capacitor 21 to short circuit any static. Capacitors 27, 28 are coupled on this operational amplifier A0.3 for frequency compensation, the output of the same being connected to its inverting input (e−) through a resistor 26.

The circuits 14 and 14', which are identical and which trigger the servomotors S1 and S2, respectively, are of known design. In each the base of NPN 37 transistor is actuated through an input resistor 36 by the output of the power feed regulator (15 or 15') associated therewith. The emitter of 37 is connected to ground and its collector is connected to a resistance 38 which receives voltage Vcc and also to the trigger of thyristor 39. The latter is connected to the first control terminal of a servomotor (S1 or S2) through capacitance 40 and a resistance 43 in series as well as to the second control terminal of the servomotor through resistance 42 and a second thyristor 44 mounted in series with resistance 42. Zener diode 41 is connected between the ground and the connection between capacitor 40, resistance 42 and thyratron 39. Thyristor 44 is mounted between the second control terminal of the servomotor and the ground. A third thyristor 45 is mounted oppositely in parallel with thyristor 44. To the second terminal of the servomotor is connected a polarized capacitance 46 whose other end is connected to the trigger of thyristor 45 through a resistance 48 and also to the first control terminal of the servomotor through series-connected diode 49 and resistance 47. An alternating voltage is applied between the ground and the first control terminal of the servomotor.

The Wheatstone bridge 11 constitutes an analogue circuit furnishing equal voltages at A1 and A2, when it is balanced, i.e., when the temperature of the thermistor T1 corresponds to the value set by the potentiometer P1. In this case, the differential amplifier 12 does not deliver any voltage at its output and the power feed regulators 15 and 15' do not deliver any power to the triggering circuits 14 and 14' respectively.

A rise in the temperature of the thermistor T1 raises the voltage at A1. The differential amplifier 12 delivers a positive voltage at its output which operates the power feed regulator 15, actuating the triggering circuit 14 which starts up the servomotor S1 is provided for shutting off the hot water supply valve, thereby lowering the ambient temperature. If the latter becomes lower than the temperature set by the potentiometer P1, the thermistor T1 lowers the voltage at A1 to a value lower than that existing at A2, so that the differential amplifier 12 delivers a negative voltage actuating the power feed regulator 15', operating the triggering circuit 14' for starting up the servomotor S2 which opens the hot water supply valve, thereby raising the ambient temperature. The temperature threshold (positive or negative value) beyond which the regulation is triggered may be adjusted by means of the resistors R1 or R2 of the power feed regulators 15 and 15' thereby permitting, as we have seen, the advance or the delay of the triggering of the periodic state of the power delivered by these power feed regulators (threshold $V_H$).

The resistors are of the carbon film type (5 percent) for the entire differential regulation circuit. If the ambient temperature becomes higher than +20° C., it is possible to use metal film resistors.

The description and drawings correspond to a particular embodiment of the power feed regulator according to the invention and of his associated differential control circuit. It is of course understood that any modification in form or in detail is possible with regard to these without leaving the scope of the present invention.

What I claim is:

1. An electric power feed regulator for obtaining, with a voltage capable of assuming alternately one operative value and one inoperative value, an output power substantially proportional to an input voltage lying between two limit values and for allowing the feeding of said output power by modifying said input voltage, comprising:
   a. an input receiving a fixed voltage, an input receiving a variable voltage and an output
   b. a hysteresis comparator circuit including an operational amplifier having two inputs connected to said inputs, an output delivering an output voltage;
   c. an inverting input and a noninverting input connected to said inputs of said hysteresis comparator;
   d. charging circuit means connected between ground and said output; and consisting of a capacitance and a resistance in series;
   e. a lower voltage limiting diode connected between the ground and said output;
   f. a first feedback loop including first impedance means connected between said noninverting input and said lower voltage limiting means;
   g. a second feedback loop including free oscillation impedance means connected between said charging circuit means and the inverting input of said operational amplifier of said comparator, said feedback loop applying voltage present at said capacitance to said inverting input of said comparator circuit, whereby the application of an input voltage lying between said fixed voltage and said variable voltage to said power feed regulator produces relaxation oscillations due to the successive charging and discharging of said capacitance, thereby allowing said power feed regulator to deliver at its output a periodic, square wave voltage having lower and higher values independent of said input voltage; the frequency of said output voltage and, for each period, the ratio of operating time to period varying as a function of said input voltage such that the average power available at said output of said power feed regulator is substantially proportional to said input voltage.

2. The power feed regulator according to claim 1 further including voltage dividing means between said output of regulator and said input thereof receiving said variable voltage.

3. The power feed regulator according to claim 1 further including voltage dividing means between said output of said regulator and said input thereof receiving said fixed voltage.

4. The power feed regulator according to claim 1 including resistances between said inputs of said regulator and said hysteresis comparator.

5. The power feed regulator according to claim 1 further including at least one capacitor connected in parallel with said operational amplifier for frequency compensation.

6. The power feed regulator according to claim 1 further including a capacitor between said inverting and noninverting inputs for short-circuiting interference.

7. The power feed regulator according to claim 1, for the control of a differential regulation circuit comprising:
  a. an analogue circuit delivering a fixed reference voltage, and a variable measurement voltage, the difference between which, or error voltage, is proportional at each instant to the difference between the value at this instant of the quantity to be regulated and its set value;
  b. a differential amplifier having an inverting and a noninverting input to which are applied said reference and said measurement voltages, respectively, and an output provided with an excursion limiter; said output being connected to said inverting input through a resistor;
  c. at least one regulating servomotor and its triggering circuit; wherein said power feed regulator is placed between the output of the differential amplifier and the input of the triggering circuit of the servomotor.

8. The power feed regulator for the control of a differential regulation circuit, according to claim 7, for the regulation of temperature in a central heating installation, wherein:
  a. said analogue circuit is a Wheatstone bridge one arm of which carries, in series, a potentiometer used for setting the temperature to be regulated and a thermistor, whose value is modified under the influence of the variations in this temperature;
  b. first and second regulation servomotors working in opposition are provided, each with a triggering circuit of the thyristor type drive by such a power feed regulator;
  c. the output of said differential amplifier is connected both to the input of the first power feed regulator leading to the inverting input of its operational amplifier and to the input of the second power feed regulator leading to the noninverting input of its operational amplifier, with the other input of each of these two power feed regulators being connected to the ground.

* * * * *